United States Patent [19]
Cooper et al.

[11] Patent Number: 4,854,661
[45] Date of Patent: Aug. 8, 1989

[54] SPLICE CRADLE

[75] Inventors: David A. Cooper, Loganton; Robert W. Barlow, Canton, both of Pa.

[73] Assignee: GTE Service Corporation, Stamford, Conn.

[21] Appl. No.: 116,851

[22] Filed: Nov. 5, 1987

[51] Int. Cl.$^4$ .............................................. G02B 6/38
[52] U.S. Cl. ............................... 350/96.20; 350/96.21
[58] Field of Search ............... 350/96.15, 96.20, 96.21, 350/96.22

[56] References Cited

U.S. PATENT DOCUMENTS

| 4,029,390 | 6/1977 | Chinnock et al. | 350/96.21 |
| 4,111,522 | 9/1978 | Auracher et al. | 350/96.21 |
| 4,146,299 | 3/1979 | Wellington et al. | 350/96.21 |
| 4,183,616 | 1/1980 | Benoit et al. | 350/96.20 |
| 4,629,284 | 12/1986 | Malavielle | 350/96.21 |
| 4,657,341 | 4/1987 | Sammueller | 350/96.22 |
| 4,662,713 | 5/1987 | Davies et al. | 350/96.20 |

Primary Examiner—Frank Gonzalez
Attorney, Agent, or Firm—William H. McNeill

[57] ABSTRACT

A splice cradle for use with fiber optic splices, such splice cradle being useful with many different types of splices and including a base, which holds the fibers in place without constraint, a lid which protects the splice from damage, and a resilient member therebetween which cushions the splice against vibration.

8 Claims, 2 Drawing Sheets

SPLICE CRADLE

BACKGROUND OF THE INVENTION

1. Field of the Invention

The present invention relates to a splice cradle for use with fiber optic splices to hold such splices in place and to cushion and protect such splices from damage.

2. Description of Prior Art

The need for some mechanical means to hold in place and otherwise protect fiber optic splices and cushion such splices against vibration is well known. Such a device is generally referred to as a splice cradle. Heretofore, prior art splice cables have been used to engage the splice per se in such a manner as to hold the splice firmly in place. However, due to the variety of mechanical splices in existence, it has become necessary to provide a different type of splice cradle having different specific physical parameters for each different type of splice. It will be apparent that the existence of such diversity in fiber optic splices requires that the user have access to many types of splice cradles, whether the user is splicing fibers in a manufacturing facility or in the field.

It is highly desirable to provide a splice cradle which can be used with the many types of splices which the user encounters in the manufacturing facility and in the field.

It is further desirable to provide such a splice cradle which engages the fibers attached to the fiber optic splice rather than the splice per se to thereby constrain the fibers to hold the splice firmly in place.

It is also desirable to provide such a splice cradle which protects the fiber optic splice from damage, cushions the splice against vibration, and yet constrains the fibers, rather than the splice per se, to hold the splice firmly in place.

SUMMARY OF THE INVENTION

This invention achieves these and other results by providing a splice cradle comprising a base including a first means forming one portion of the base for fixedly aligning an end of a first fiber relative to an end of a second fiber; a second means forming an opposite portion of the base for fixedly aligning the end of the second fiber relative to the end of the first fiber; and, third means forming another portion of the base between the first means and the second means for supporting, without constraining, a splice which joins the end of the first fiber and the end of the second fiber. The splice cradle also includes means forming a lid to the base for protecting and cushioning the splice when the lid is in a closed position and for providing access to the base when the lid is in an open position.

DESCRIPTION OF THE PREFERRED EMBODIMENT

Figure 1:
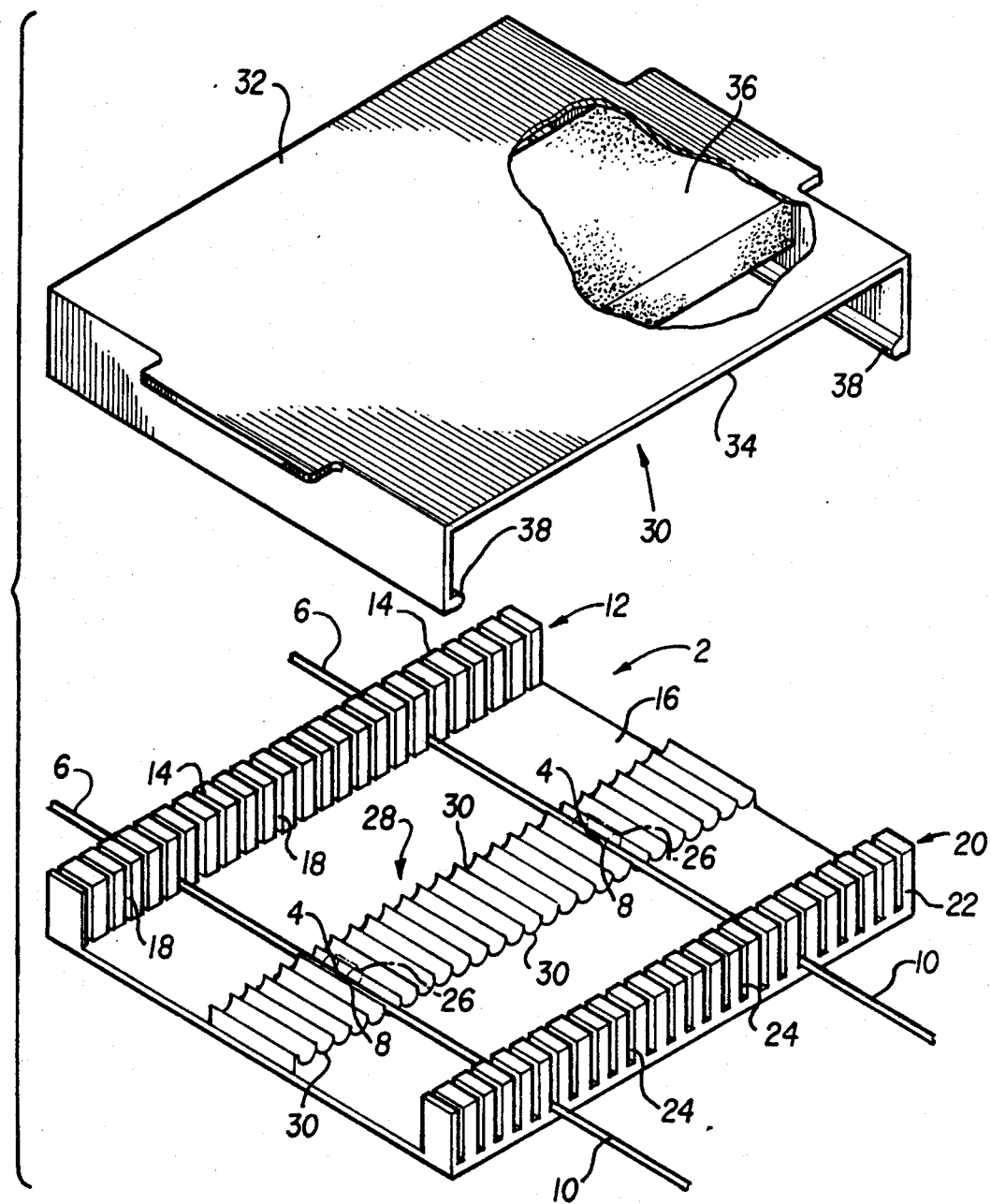
FIG. 1 is a partially cut-away perspective view of a splice cradle base and lid of the present invention in an open portion; and, FIG. 2 is a perspective view of the splice cradle of FIGS. 1, in a closed position.
Figure 2:
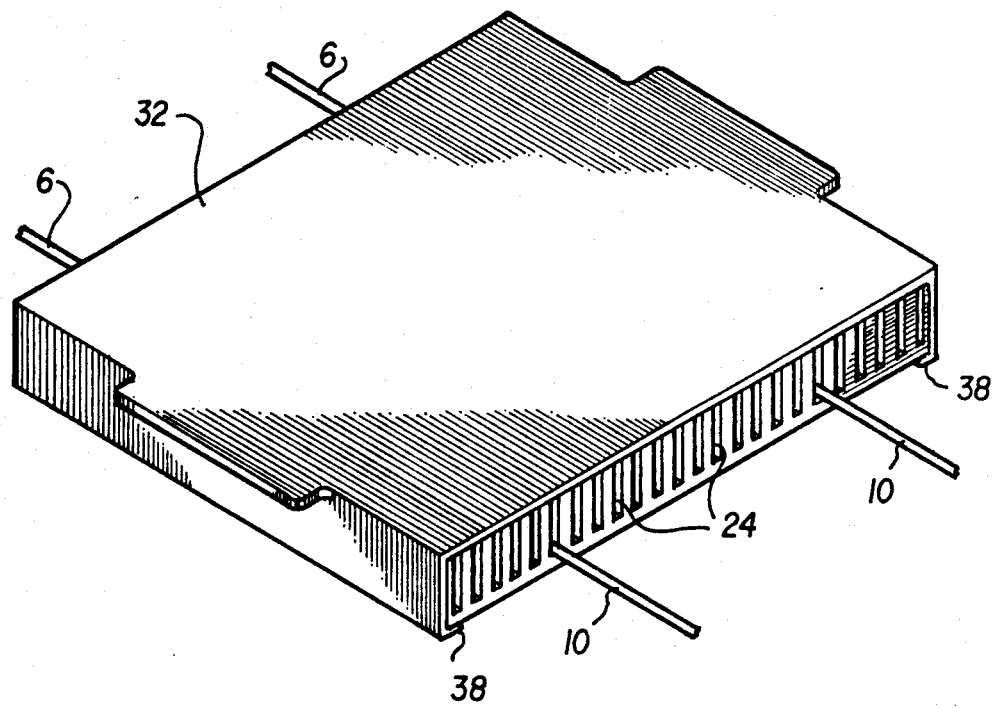

The embodiment of this invention which is illustrated in FIGS. 1 and 2 is particularly suited for achieving the objects of this invention. FIG. 1 depicts a planar base 2 of the splice cradle of the present invention. Base 2 includes first means forming one portion of the base for fixedly aligning an end 4 of a fiber 6 relative to an end 8 of a another fiber 10. In the preferred embodiment such first means includes a comb-like member 12 including a plurality of spaced teeth 14 which extend away from upper surface 16 of the base 2. The comb-like member 12 extends adjacent one edge of upper surface 16. Adjacent ones of the teeth 14 of the comb-like member 12 have first spaces 18 therebetween to allow entry of a fiber 6 and to hold fiber 6 in place.

Base 2 also includes corresponding second means forming an opposite portion of the base for fixedly aligning end 8 of fiber 10 relative to end 4 of fiber 6. In the preferred embodiment such second means includes another comb-like member 20 including another plurality of spaced teeth 22 which extend away from upper surface 16. The comb-like member 20 extends adjacent an opposite edge of upper surface 16. Adjacent ones of the teeth 22 of the comb-like member 20 have second spaces 24 therebetween to allow entry of a fiber 10 and to hold fiber 10 in place. The spaces 18 between adjacent ones of teeth 14 of comb-like member 12 are aligned with corresponding spaces 24 between adjacent ones of teeth 22 of comb-like member 20 to align the end 4 of fiber 6 relative to the end 8 of a corresponding aligned fiber 10.

Base 2 further includes third means forming another portion of the base located between the first means and the second means for supporting, without constraining, a splice 26 which joins end 4 of fiber 6 to end 8 of fiber 10. Splice 26 is depicted schematically in FIG. 1 since the specific type of splice forms no part of the present invention. In the preferred embodiment the third means includes a grooved portion extending intermediate of the comb-like portions and including a plurality of grooves 28, each groove 30 of the plurality of grooves 28 being aligned with respective corresponding aligned spaces 18, 24 of comb-like member 12 and comb-like member 20. Since grooves 30 merely provide support surfaces for respective splices, without constraining such splices, the dimensioning and configuration of grooves 30 need not be such as to be useful with only specific splices but rather will be configured to support without constraint the various splices which the user encounters in the manufacturing facility and in the field.

The present invention also includes means forming a lid to base 2 for protecting and cushioning each splice 26 when the lid is in a closed position and for providing access to said base when the lid is in an open position. In the preferred embodiment a lid 30 is provided which includes an upper surface 32 and a lower surface 34. Lower surface 34 faces the plurality of grooves 28. In such embodiment, a resilient member 36 is sandwiched between the plurality of grooves 28 and the lower surface 34 when the lid is in the closed position. Such resilient member 36 is preferably a foam-like cushion which is adhered to lower surface 34, as for example, by means of an adhesive.

In the preferred embodiment the base 2 and lid 30 are of such a configuration or dimension that the lid can be snapped to a closed or open position. In the preferred embodiment depicted in the drawings the lid can be snapped onto (FIG. 2) or snapped off of (FIG. 1) the base. For example, a projection 38 is provided for snapping over an adjacent edge of base 2 when the lid is positioned in the closed position. Projection 38 is depicted schematically since the specific type of snap-on lid forms no part of the present invention. In an alternative embodiment, the lid can be pivotally coupled to the base so that the lid can be pivoted to an open or closed position. Whatever means is provided for removably coupling the lid and base, when the lid is snapped to an open position, access is provided to the base so that fibers 6, 10 can be inserted into spaces 18, 24, respectively, and corresponding splices 26 rest upon corresponding grooves 30. When the lid is snapped to a closed position, the resilient member 36 is thereby sandwiched between the plurality of grooves 28 and the lower surface 34. In this manner, the teeth of the comb-like members 12 and 20 serve to engage the fiber attached to the fiber optic splice, rather than the splice per se, to constrain the fiber to hold the splice firmly in place. The lid 30 protects each fiber optic splice from damage, and the resilient member 36 cushions each splice against vibration.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A splice cradle comprising:
a base including a first means forming one portion of said base for fixedly aligning an end of at least one fiber relative to an end of at least one other fiber; a second means forming an opposite portion of said base for fixedly aligning said end of said at least one other fiber relative to said end of said at least one fiber; and, third means forming another portion of said base between said first means and said second means for supporting, without constraining, a splice which joins said end of said at least one fiber and said end of said at least one other fiber; and,
means forming a lid to said base for protecting and cushioning each splice when said lid is in a closed position and for providing access to said base when said lid is in an open position.

2. The splice cradle of claim 1 wherein said first means includes a comb-like member including a plurality of spaced teeth which extend away from a surface of said base, adjacent ones of said teeth of said comb-like member having first spaces therebetween to allow entry of one of said at least one fiber and to hold said one of said at least one fiber in place, and further wherein said second means includes another comb-like member including another plurality of spaced teeth which extend away from said surface of said base, adjacent ones of said teeth of said another comb-like member having second spaces therebetween to allow entry of one of said at least one other fiber and to hold said one of said at least one other fiber in place, said spaces between adjacent ones of said teeth of said comb-like member being aligned with corresponding ones of said spaces between adjacent ones of said teeth of said another comb-like member to align an end of said one of said at least one fiber relative to an end of said at least one other fiber.

3. The splice cradle of claim 2 wherein said third means includes a plurality of grooves, each groove of said plurality of grooves being aligned with respective aligned spaces of said comb-like member and said another comb-like member.

4. The splice cradle of claim 3 wherein said lid includes an upper surface and a lower surface, said lower surface facing said plurality of grooves, and wherein there is a resilient member sandwiched between said grooves and said lower surface when said lid is in said closed position.

5. The splice cradle of claim 4 wherein said resilient member is a foam-like cushion.

6. The splice cradle of claim 5 wherein said foam-like cushion is adhered to said lower surface.

7. The splice cradle of claim 6 wherein said lid includes means forming one portion of said lid for removably coupling said lid to said base.

8. A splice cradle comprising:
a planar base including an upper surface;
a first comb-like portion extending adjacent one edge of said upper surface, said first comb-like portion including a first plurality of spaced teeth which extend away from said upper surface, adjacent ones of said teeth of said first comb-like portion having first spaces therebetween to allow entry of a fiber, and to hold said fiber in place;
a second comb-like portion extending adjacent an opposite edge of said upper surface, said second comb-like portion including a second plurality of spaced teeth which extend away from said upper surface, adjacent ones of said teeth of said second comb-like portion having second spaces therebetween to allow entry of another fiber and to hold said another fiber in place, said spaces between adjacent ones of said teeth of said first comb-like portion being aligned with corresponding ones of said spaces between adjacent ones of said teeth of said second comb-like portion to allow alignment of an end of said fiber with an end of said another fiber;
a grooved portion extending intermediate of said first and second comb-like portions, said grooved portion including a plurality of grooves, each groove of said plurality of grooves being aligned with respective aligned spaces of said first and second comb-like portions and each groove of said plurality of grooves being configured for supporting, without constraining, a splice which joins said end of said fiber and said end of said another fiber; and,
a lid removable relative to said upper surface of said planar base, said lid having an upper lid surface and a lower lid surface, said lower lid surface facing said upper surface of said planar base, and a resilient member affixed to said lower lid surface and being sandwiched between said lower lid surface and said grooved portion of said planar base.

* * * * *

UNITED STATES PATENT AND TRADEMARK OFFICE
CERTIFICATE OF CORRECTION

PATENT NO. : 4,854,661

DATED : August 8, 1989

INVENTOR(S) : David A. Cooper, et al.

It is certified that error appears in the above—identified patent and that said Letters Patent is hereby corrected as shown below:

Cover page, Item No. 73;

"GTE Service Corporation" should read

--GTE Products Corporation--.

Signed and Sealed this

Twenty-second Day of May, 1990

Attest:

HARRY F. MANBECK, JR.

Attesting Officer

Commissioner of Patents and Trademarks